United States Patent
Musa et al.

(10) Patent No.: US 9,853,543 B2
(45) Date of Patent: Dec. 26, 2017

(54) SWITCHED MODE POWER SUPPLY CONTROL

(71) Applicant: Delphi Technologies, Inc., Troy, MI (US)

(72) Inventors: Osman Musa, Kokomo, IN (US); Mark W. Gose, Kokomo, IN (US); Jerry W. Campbell, Carmel, IN (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/139,707

(22) Filed: Apr. 27, 2016

(65) Prior Publication Data

US 2017/0317586 A1    Nov. 2, 2017

(51) Int. Cl.
*H02M 1/38* (2007.01)
*H02M 3/156* (2006.01)
*H02M 1/08* (2006.01)

(52) U.S. Cl.
CPC ............ *H02M 3/156* (2013.01); *H02M 1/08* (2013.01)

(58) Field of Classification Search
CPC ...... H02M 3/156; H02M 1/4225; H02M 1/08; Y02B 70/126
USPC .... 323/207, 222, 224, 282–289; 363/44, 81, 363/84, 89, 126, 127
See application file for complete search history.

(56) References Cited

U.S. PATENT DOCUMENTS

| 6,473,286 | B1 * | 10/2002 | Itabashi et al. | F02D 41/20 123/490 |
| 7,621,259 | B2 * | 11/2009 | Mayuzumi | F02D 41/20 123/490 |
| 8,081,498 | B2 * | 12/2011 | Mayuzumi et al. | F02D 41/20 123/490 |
| 8,593,127 | B2 * | 11/2013 | Odell | H02M 1/12 323/207 |
| 8,776,763 | B2 * | 7/2014 | Omori et al. | F02D 41/20 123/445 |
| 2005/0168206 | A1 * | 8/2005 | Nadd | H02M 1/08 323/285 |
| 2006/0284607 | A1 | 12/2006 | Isobe | |
| 2011/0316508 | A1 | 12/2011 | Cheng et al. | |
| 2014/0375286 | A1 | 12/2014 | Jiang et al. | |

* cited by examiner

Primary Examiner — Rajnikant Patel
(74) Attorney, Agent, or Firm — Lawrence D. Hazelton

(57) ABSTRACT

An illustrative example embodiment of a method is for controlling a switch. The switch is used to charge a capacitor that provides an output voltage. The switch has an inductor on an input side between a power source and the switch. The method includes: initiating a switching cycle including turning on the switch, sensing a voltage representing current through the inductor, using a reference voltage as a basis for turning off the switch during the switching cycle when the sensed voltage exceeds the reference voltage, and setting an initial value of the reference voltage at a beginning of the switching cycle based on at least one feature of an activation of the switch during at least one previous switching cycle.

19 Claims, 3 Drawing Sheets

SWITCHED MODE POWER SUPPLY CONTROL

BACKGROUND

Switched mode power supplies (SMPS) are useful for a variety of situations. Typical SMPS are configured to have an upper threshold on the output voltage. In some applications, a boost supply is desired where the output voltage is required to be as much as twice the input voltage. Slope compensation may be used to provide stability to the current control loop of the SMPS. Known slope compensation techniques include adding a positive slope to a current sense voltage or adding a negative slope to a reference voltage. When the current sense voltage exceeds the reference voltage, the switch is turned off.

The magnitude of the slope required for dampening the transient step response in a SMPS is well studied. For a boost supply configuration, a function of the slope of an inductor current during the off time of the switch provides the appropriate slope. Including such a compensation slope is relatively straightforward in a closed loop configuration utilizing negative feedback because the average inductor current is equal to the load current. In open loop implementations, however, it is challenging to set the reference voltage so that the compensated reference voltage and the current sense voltage intersect when the conductor peak current is at a desired value. Known techniques require knowledge of the input voltage and the output voltage, among other parameters. In some situations, the input voltage tends to be ill-defined, which is the case when the input voltage is based on a typical automotive vehicle battery. The peak current may vary significantly with such an input voltage source.

It is challenging to control the reference voltage in a manner that provides circuit stability and keeps the inductor current within desired limits. If the inductor current is not controlled adequately, more expensive components are required.

SUMMARY

An illustrative example embodiment of a method is for controlling a switch. The switch is used to charge a capacitor that provides an output voltage. The switch has an inductor on an input side between a power source and the switch. The method includes: initiating a switching cycle including turning on the switch, sensing a voltage representing current through the inductor, using a reference voltage as a basis for turning off the switch during the switching cycle when the sensed voltage exceeds the reference voltage, and setting an initial value of the reference voltage at a beginning of the switching cycle based on at least one feature of an activation of the switch during at least one previous switching cycle.

An illustrative example embodiment of a switch control device includes a switch that is activated to charge a capacitor that provides an output voltage. An inductor is on an input side of the switch between a power source and the switch. A switching cycle control element initiates activation of the switch at the beginning of a switching cycle. A comparator provides an indication of a relationship between a sensed voltage representing current through the inductor and a reference voltage. The switching cycle control element turns off the switch during the switching cycle based on the indication from the comparator when the sensed voltage exceeds the reference voltage. At least one feedback loop provides an indication of at least one feature of an activation of the switch during at least one previous switching cycle. The reference voltage is set to an initial value at a beginning of the switching cycle based on the indication of the at least one feature from the previous switching cycle.

Various features and advantages of disclosed embodiments will become apparent to those skilled in the art from the following detailed description. The drawings that accompany the detailed description can be briefly described as follows.

DETAILED DESCRIPTION

A device or method designed according to an embodiment of this invention utilizes feedback information from at least one previous switching cycle for setting an initial reference voltage value at the beginning of a switching cycle. The initial reference voltage value facilitates maintaining a peak current of an inductor within a selected limit in a manner that is independent of a ratio between an output voltage and an input voltage.

Figure 1:
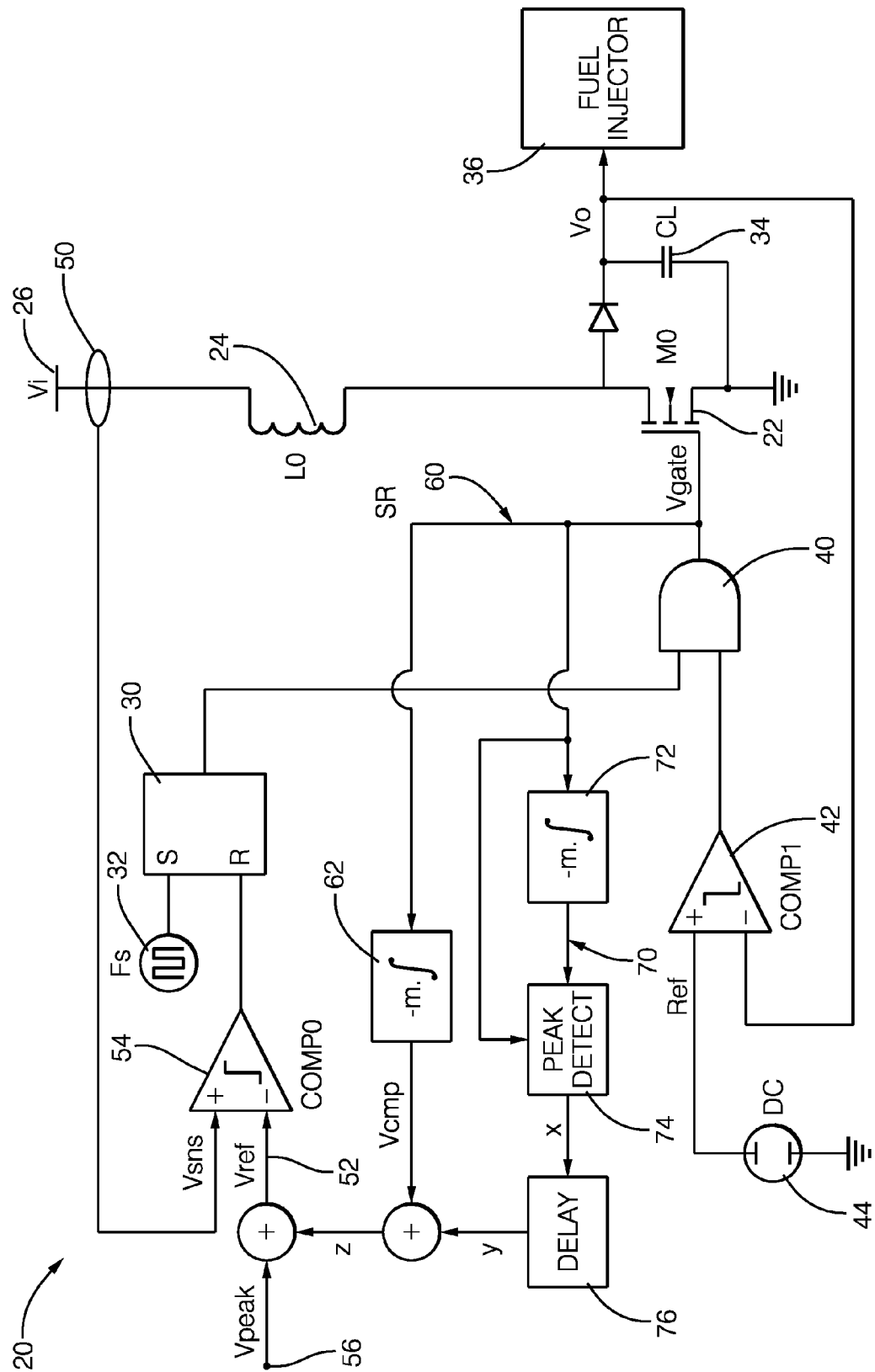
FIG. 1 schematically illustrates a switch control device designed according to an embodiment of this invention.

FIG. 1 schematically illustrates a device 20 for controlling a switch 22 that has an inductor 24 associated with the switch 22. The inductor 24 is between the switch 22 and a source 26 of an input voltage (Vi). The device 20 is configured as a switched mode power supply (SMPS) boost control circuit.

A switching cycle control element 30 activates or turns on the switch 22 at the beginning of a switching cycle. The illustrated example includes a pulse generator 32 that operates at a selected frequency for controlling the length of a switching cycle. When the switch 22 is activated, power from the source 26 charges a capacitor 34 that provides power to a load 36. The output power is discussed in terms of an output voltage (Vo) in this description. An example type of load 36 is a fuel injector for an automotive vehicle engine.

The output of the switching cycle control element 30 is provided to an AND gate 40. The output of the AND gate 40 is provided to the switch activation input of the switch 22. A comparator or amplifier 42 compares the output voltage Vo to a reference voltage provided by a device 44, which may be a DC source. When Vo is less than the reference voltage provided by the source 44, the output of the comparator 42 corresponds to a logical 1 and the switch remains active for charging the capacitor 34. If Vo exceeds the reference voltage provided by the source 44, the comparator 42 output corresponds to a logical 0 and the switch 22 is deactivated. After Vo drops below the hysteresis level of the comparator 42, the device 20 is enabled again to start recharging the output capacitor 34 based on operation of the switching control element 30.

A sensor 50 provides an indication of a voltage corresponding to a current through the inductor 24. The sensed voltage Vsns and a reference voltage Vref are provided to a comparator 54. When Vsns exceeds Vref, the comparator 54 output corresponds to a logical 1 triggering the reset of the switching cycle control element 30, which deactivates or turns off the switch 22. In this example, Vref is based on a voltage from a source 56.

The illustrated example includes a feedback loop 60 that includes an integrator 62 that provides a compensation voltage Vcmp. In this example, Vcmp causes Vref to progressively decrease during a switching cycle (k).

Another feedback loop 70 includes an integrator 72, a peak detector element 74 and a delay element 76. Information from the feedback loop 70 is utilized for setting an initial value of Vref at the beginning of a switching cycle. The delay element 76 in one example is triggered by operation of the switching cycle control element 30 so that information regarding at least one feature of an activation of the switch 22 during a previous switching cycle (k−1) influences or adjusts the initial value of Vref at the beginning of the switching cycle (k).

If the device 20 did not include the feedback loops 60 and 70, it would be an SMPS with no slope compensation for Vref. In such a circumstance, the duty cycle of the switch on time can be expressed as a function of the input voltage Vi, the output voltage Vo and the previous duty cycle as $$d(k) = \frac{vo - vi}{vi} \cdot (1 - d(k-1)) \tag{1}$$

where d is the duty cycle and k is the switching period index number. According to the expression above, if the gain term (Vo−Vi)/Vi is larger than or equal to 1, the duty cycle will become unstable. With slope compensation, which can be achieved using the feedback loop 60, the duty cycle can be written as $$d(k) = \frac{Slp \cdot d(k-1) + \frac{vo - vi}{L} \cdot (1 - d(k-1))}{\frac{vi}{L} + Slp} \tag{2}$$

where Slp is the slew rate of the compensating slope in amperes per second. Equation 2 is stable for all values of Vo/Vi under the condition that the gain term shown in the following equation is less than 1.

$$\frac{\frac{vo-vi}{L} - Slp}{\frac{vi}{L} + Slp} < 1 \tag{3}$$

This condition is satisfied if the compensation slope meets the following criteria:

$$Slp > \frac{1}{2}\frac{vo - 2vi}{L} \tag{4}$$

The duty cycle can be stabilized within one switching period if the gain term in Equation 3 is set to 0 by setting the compensation slope to be greater than or equal to the off-time slope, which may be expressed as $$Slp \geq \frac{vo - vi}{L} \tag{5}$$

The compensation is accomplished in FIG. 1 by adding the compensation voltage Vcmp output from the integrator 62 to Vref. During the switching cycle at steady state, the magnitude of the initial value of Vref is such that with compensation the value of Vref intersects with or becomes equal to the sensed voltage Vsns when the inductor current equals an intended peak current (Vpeak). This condition may be expressed using the following equation:

$$V_{initial} - V_\Delta = V_{peak} \tag{6}$$

Under conditions in which Vpeak is equal to Vref, $V\Delta$ is equal to $mt_{on}$, where m is the slope of the compensation voltage Vcmp in volts per second and $t_{on}$ is the on time of the switch 22. Within this description, $V\Delta$ is referred to as the compensation headroom.

The on time of the switch $t_{on}$ for the device 20 may be estimated using the following relationship $$t_{ON} = \left(1 - \frac{vin}{vout}\right) \cdot T_{SW} \tag{7}$$

where Tsw is the switching period.

Based on the relationships mentioned above, as the ratio Vo/Vi increases, the reference value Vref will also increase. It follows that the peak current through the inductor, which is represented by the corresponding voltage Vpeak, will vary with the variation in the ratio Vo/Vi.

The feedback loop 70 is provided within the device 20 for controlling Vref and its initial value in a manner that allows for operating the inductor 24 at a preselected peak current corresponding to Vpeak. By knowing the saturation current value of the inductor 24, it becomes possible to use more economical components such as the inductor 24. According to this example embodiment, the initial value of Vref is set to correspond to Vpeak plus the compensation headroom. Accordingly, the voltage source 56 for Vref in this example provides a voltage having a value corresponding to Vpeak. Utilizing the feedback loop 70 for regulating the initial value of Vref allows for maintaining a peak current of the inductor 24 that is independent from the ratio Vo/Vi.

The integrator 72 measures the duty cycle of the on time of the switch 22. The output from the integrator 72 may be represented by the following expression:

$$x = m \cdot \int_0^{du \cdot T} V_{gate} \cdot dt \tag{8}$$

where Vgate corresponds to the gate signal of the switch 22. The definition of the constant m can be made consistent with the definition of the compensation slope m described above if the integrator 72 only takes into account the on time of the switch 22. The peak detector 74 latches the peak value of Vgate, which occurs at the end of the on time of the switch 22. The delay component 76 operates to introduce the information regarding the switch activation 22 obtained by the feedback loop 70 during a switching cycle k−1 at the beginning of a subsequent switching cycle k. The output from the feedback loop 70 effectively adds the compensation headroom to the value of Vpeak to establish an initial value of Vref at the beginning of the switching cycle k.

In the following equation, the function y represents a prediction of the value of the compensation headroom for the next switching cycle.

$$y(k) = x(k-1) = V_\Delta(k) \tag{9}$$

During the switching cycle k, Vref can be represented by the following equation:

$$V_{ref} = V_{peak} + V_\Delta - m \cdot \int_0^{du \cdot T} V_{gate} dt \qquad (10)$$

Figure 2:
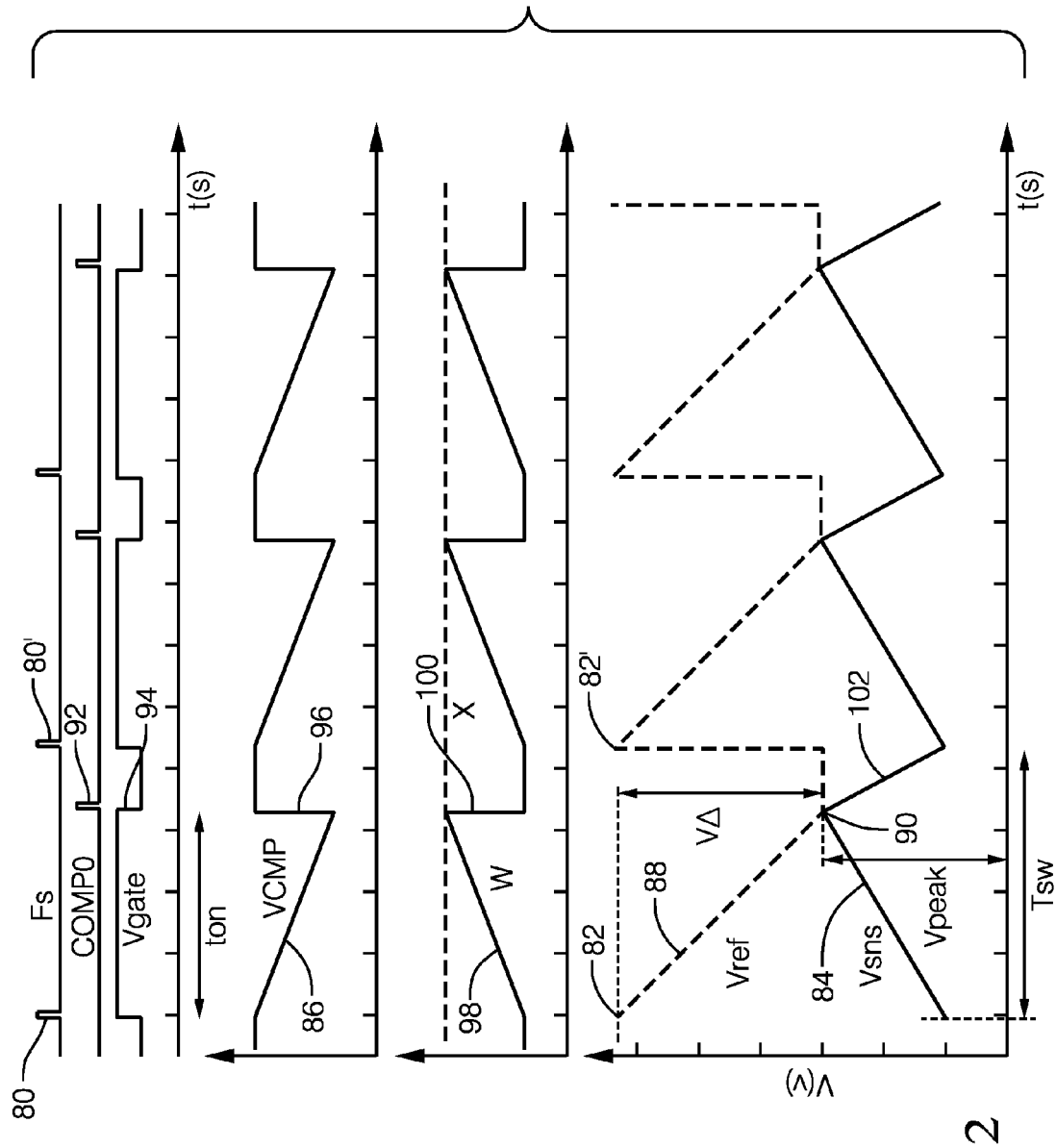
FIG. 2 is a timing diagram illustrating selected features of an example operation of the embodiment of FIG. 1.

FIG. 2 is a timing diagram schematically representing several features of the operation of the device 20 shown in FIG. 1. A triggering or initiating pulse 80 from the pulse generator 32 initiates a switching cycle k having a period Tsw. At the beginning of the switching cycle, Vref has an initial value shown at 82. The sensed voltage Vsns is represented at 84 and increases during the switching cycle while the switch 22 is activated for energizing the inductor 24. During the ON-time the switch allows energy to build up in the inductor by causing the inductor current to increase. During the OFF-time of the switch, the inductor current will be steered to the capacitor through the diode causing the capacitor to charge. The compensation voltage Vcmp introduced by the feedback loop 60 is shown at 86. The negative slope or negative compensation causes Vref to decrease as shown at 88.

As shown at 90, Vsns intersects with or equals Vref when Vsns equals Vpeak. At that time, Vref has decreased from the initial value at 82 by the value $V\Delta$ (e.g., the compensation headroom amount). When the value of Vsns reaches the value of Vref, the comparator 54 provides a reset pulse shown at 92, which turns off the switch 22 as represented by the value of Vgate shown at 94. At the same time, the integrator 62 stops so that Vcmp no longer decreases as shown at 96. The integrator 62 restarts at the beginning of a next switching cycle represented by the next pulse 80' provided by the pulse generator 32.

During the switching cycle k the integrator 72 output increases as shown at 98. The peak detector 74 detects a peak and the integrator 72 stops operating as shown at 100, which corresponds in time to the instant where Vsns equals Vref as shown at 90. Given that no more compensation voltage Vcmp is being applied to Vref, the ref remains at the value Vpeak as shown at 102 until the start of the next switching cycle k+1.

The initial value of Vref for the next switching cycle k+1 is shown at 82'. This initial value is based upon Vpeak plus the information from the feedback loop 70 represented by the output of the integrator 72 from the previous switching cycle k shown at 98. Given that the integrator 72 only operates during the on time of the switch 22, the initial value of Vref at the beginning of the switching cycle k+1 is based on at least one feature of the activation of the switch 22 during the previous switching cycle k. In this particular embodiment, the feature of the activation of the switch 22 that is used for setting the initial value of Vref includes the on time duty cycle of the switch 22.

The transient response of the system and its stability criteria can be understood by considering the following model that expresses the slope compensation technique utilized in FIGS. 1 and 2. As mentioned above, the feedback loop 70 provides compensation information based on the on time duty cycle of a previous switching cycle for setting an initial value of Vref. Assuming the device 20 is in steady state, $V\Delta$ of a switching cycle k may be expressed as:

$$V_\Delta(k) = m \cdot T \cdot du(k-1) \qquad (11)$$

This relationship can be exploited to derive a discrete-time expression for the closed-loop compensation provided by the device 20 without filtering. The following equation is one representation of such an expression.

$$du(k) = \frac{Slp \cdot (2 \cdot du(k-1) - du(k-2)) + \frac{vo-vi}{L}(1-du(k-1))}{Slp + \frac{vi}{L}} \qquad (12)$$

The duty cycle expression for such closed-loop compensation reveals that the duty cycle is affected by the histories of two prior switching cycles. In steady state conditions, the duty cycles of the periods k and k−1 are equal in magnitude but have an effect on the current duty cycle that is opposite in polarity. Accordingly, the duty cycle expression can be rearranged as follows:

$$du(k) = \frac{\frac{vo-vi}{L} + \left(\frac{vo-vi}{L} - 3Slp\right) \cdot du(k-1)}{Slp + \frac{vi}{L}} \qquad (13)$$

The SMPS device 20 is stable under the following condition:

$$\frac{vo-vi}{L} - 3Slp < Slp + \frac{vi}{L} \qquad (14)$$

Stability is achieved when the compensation slope satisfies the following criteria:

$$Slp > \frac{1}{4} \frac{vo-2vi}{L} \qquad (15)$$

In the illustrated example, the convergence criteria for the closed-loop compensation is half that of open loop compensation. The duty cycle expression of the closed-loop compensation from Equation 15 indicates that there is no slope compensation value that will entirely null out the contribution of previous duty cycles. Accordingly, the step-response of the closed-loop compensation will exhibit ringing before stabilizing to the duty cycle value independent of the choice of the compensation slope.

Figure 3:
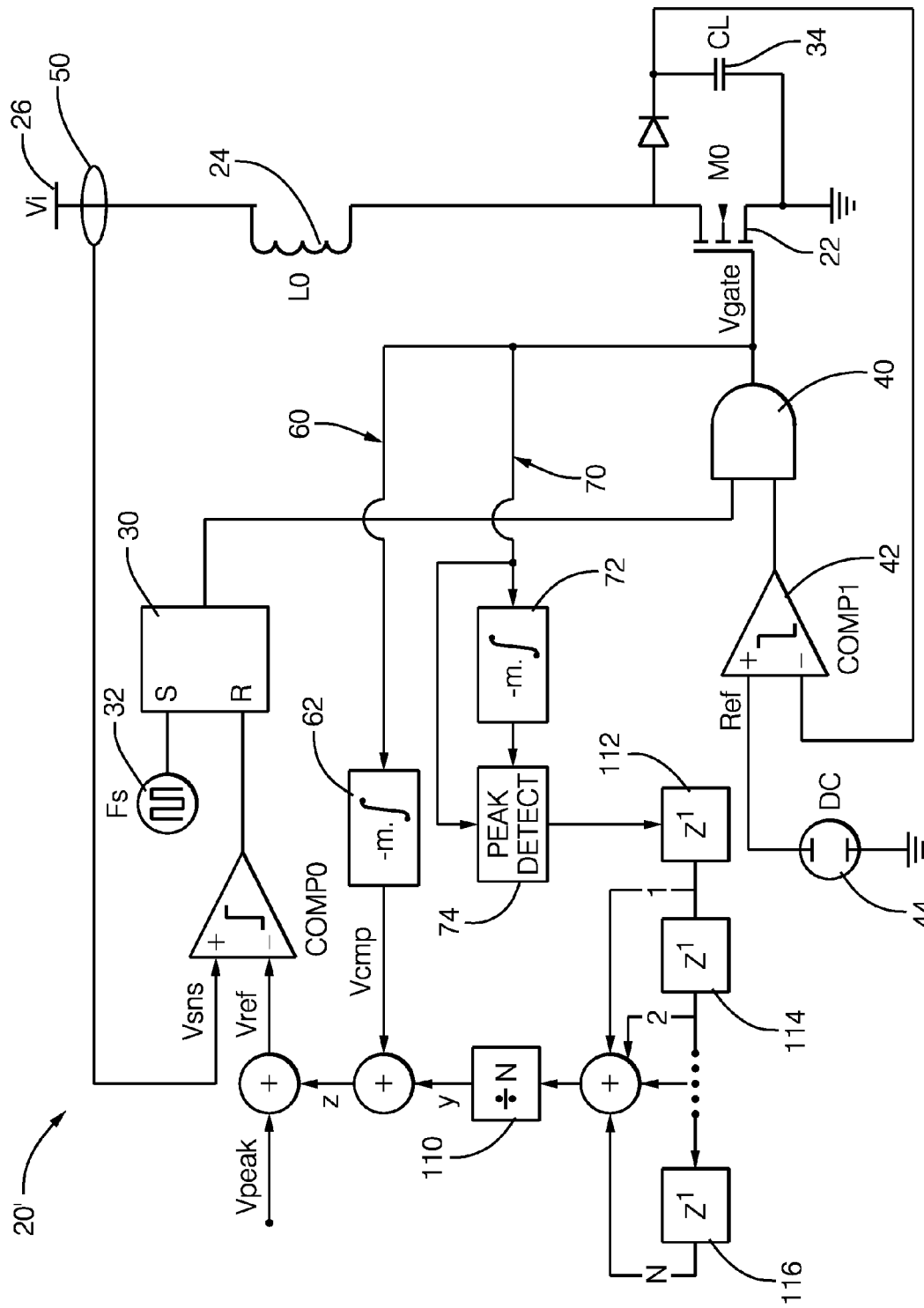
FIG. 3 schematically illustrates another example embodiment of a switch control device.

FIG. 3 schematically illustrates another SMPS device 20' designed according to an embodiment of this invention. One feature of the embodiment of FIG. 3 compared to the embodiment of FIG. 1 is that the arrangement in FIG. 3 includes averaging features to reduce any potential for overshoot during initialization of the power supply 56 and minimizing susceptibility to noise. In FIG. 3, the output of the feedback loop 70 is maintained at least temporarily for a plurality of previous switching cycles (k−n, n=1, 2, 3 . . . ). An averaging component 110 determines an average of the information regarding the previous switching cycle switch activations represented at 112, 114 and 116. The average information is used for setting the initial value of Vref at the beginning of the next switching cycle. A generalized expression for closed-loop sloop compensation using an arrangement as shown in FIG. 3 is:

$$du(k) = \frac{Slp \cdot \left(\frac{N+1}{N} \cdot du(k-1) - \frac{1}{N} \cdot du(k-(N+1))\right) + \frac{vo - vi}{L}(1 - du(k-1))}{Slp + \frac{vi}{L}} \qquad (1)$$

where N is the number of samples used for the averaging procedures. Without averaging, N has a value of 1 and the expression of Equation 16 becomes the expression of Equation 12.

The illustrated example embodiments utilize closed-loop slope compensation based on information from at least one previous switching cycle to provide a prediction of the value of the current reference compensation headroom. Utilizing such information for setting an initial value of Vref will cause the compensated Vref and the Vsns to intersect when the current through the inductor 24 is equal to a preselected peak current value. The illustrated examples ensure that the duty cycle at which the intersection between Vsns and Vref occurs is equal to the theoretical duty cycle, which is a function of the input and output voltages (e.g., Vi and Vo) of the SMPS device 20. The slope compensation of the illustrated examples is applied without introducing a dependency between the peak current and the ratio of the input and output voltages.

An example implementation of the device 20 is realized as an ASIC and is implemented digitally by using counters with programmable clock rates to mimic the integration procedures and a fast digital to analog converter to convert predicted current reference information for comparison with the sensed inductor current.

The functions of the integrators 62 and 72 in one embodiment are implemented by charging and discharging a capacitor using a current source with high output impedance. If the current source output impedance is large enough to be ignored, then the slope compensation slope m can be expressed as m=Icmp/Ccmp, where Icmp and Ccmp are the compensation current and capacitance respectively.

The disclosed examples allow for selecting an inductor having a known peak current threshold and being able to control current through the inductor in a manner that provides system stability and insures longevity of the inductor. One aspect of this feature of the disclosed embodiments is that it allows for using less expensive inductors, which is advantageous.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling a switch that is used to charge a capacitor that provides an output voltage (Vo), the switch having an inductor on an input side of the switch between a power source (Vi) and the switch, the method comprising:
    initiating a switching cycle (k) including turning on the switch;
    sensing a voltage (Vsns) representing current through the inductor;
    using a reference voltage (Vref) as a basis for turning off the switch during the switching cycle (k) when Vsns exceeds Vref; and
    setting an initial value of Vref at a beginning of the switching cycle based on at least one feature of an activation of the switch during at least one previous switching cycle (k-n) and reducing Vref during the switching cycle.

2. The method of claim 1, comprising reducing Vref during the switching cycle using a rate such that Vref will be approximately equal to a voltage (Vpeak) corresponding to a preselected peak current threshold of the inductor at a time when Vsns equals Vpeak.

3. The method of claim 2, wherein reducing Vref comprises using feedback information regarding a gate voltage of the switch during the switching cycle.

4. The method of claim 1, wherein the at least one feature of the activation of the switch is based upon at least a duty cycle on time of the switch during the previous switching cycle (k-n).

5. The method of claim 4, wherein the at least one feature of the activation of the switch is based on integrating a gate voltage (Vgate) of the switch over the on time of the switch during the previous switching cycle.

6. The method of claim 5, comprising determining the on time of the switch during the previous switching cycle by detecting a peak of an integration of Vgate during the previous switching cycle.

7. The method of claim 1, comprising determining the at least one feature of the activation of the switch for each of a plurality of previous switching cycles (k-n), wherein n=1, 2, . . . m;
    averaging the determined at least one feature of the plurality of previous switching cycles (k-n); and
    using the averaged at least one feature for setting the initial value of Vref.

8. The method of claim 1, comprising
    predetermining a desired peak current for the inductor; and
    turning off the switch during the switching cycle (k) when the current through the inductor equals or exceeds the desired peak current for the inductor.

9. The method of claim 1, comprising using the switch to control power to a fuel injector.

10. A switch control device, comprising:
    a switch that is used to charge a capacitor that provides an output voltage (Vo);
    an inductor on an input side of the switch between a power source and the switch;
    a switching cycle control element that initiates activation of the switch at the beginning of a switching cycle (k);
    a comparator that provides an indication of a relationship between a voltage (Vsns) representing current through the inductor and a reference voltage (Vref), the switching cycle control element turning off the switch during the switching cycle (k) based on the indication from the comparator when Vsns exceeds Vref;
    at least one feedback loop that provides an indication of at least one feature of an activation of the switch during at least one previous switching cycle (k-n), wherein Vref is set to an initial value at a beginning of the switching cycle (k) based on the indication of the at least one feature during the previous switching cycle and Vref is reduced during the switching cycle.

11. The device of claim 10, wherein
    Vref is reduced during the switching cycle from the initial value at a rate such that Vref will be approximately equal to a voltage (Vpeak) corresponding to a preselected peak current threshold of the inductor at a time when Vsns equals Vpeak; and the switching cycle control element turns off the switch when Vsns exceeds Vref.

12. The device of claim 11, comprising a second feedback loop that provides information regarding a gate voltage of the switch during the switching cycle; and wherein Vref is reduced at a rate based on the information regarding the gate voltage of the switch during the switching cycle.

13. The device of claim 10, wherein the at least one feature of the activation of the switch is based upon at least a duty cycle ON-time of the switch during the previous switching cycle (k−n).

14. The device of claim 13, wherein the at least one feedback loop comprises an integrator that is configured to integrate a gate voltage (Vgate) of the switch over the on time of the switch during the previous switching cycle; and the at least one feature of the activation of the switch is based on an output of the integrator.

15. The device of claim 14, wherein the at least one feedback loop comprises a peak detector configured to detect a peak of an integration of Vgate during the previous switching cycle; and the detected peak of Vgate indicates an end of the on time of the switch during the previous switching cycle.

16. The device of claim 10, wherein the at least one feedback loop determines the at least one feature of the activation of the switch for each of a plurality of previous switching cycles (k−n), wherein n=1, 2, . . . m;

the at least one feedback loop is configured to determine an average of the determined at least one feature of the plurality of previous switching cycles (k−n); and the averaged at least one feature is used for setting the initial value of Vref.

17. The device of claim 10, wherein the inductor has a predetermined desired peak current; and the switching control element turns off the switch during the switching cycle (k) when a current through the inductor equals or exceeds the desired peak current for the inductor.

18. The device of claim 10, comprising a load that is powered by the output of the switch.

19. The device of claim 18, wherein the load comprises a fuel injector.

* * * * *